Oct. 17, 1939.  A. J. CAWLEY  2,176,847
SCANNING APPARATUS
Filed Aug. 7, 1930   3 Sheets-Sheet 1

INVENTOR
Aloysius J. Cawley
BY
ATTORNEY

Oct. 17, 1939.  A. J. CAWLEY  2,176,847
SCANNING APPARATUS
Filed Aug. 7, 1930   3 Sheets-Sheet 3

Inventor
Aloysius J. Cawley
By
Attorney

Patented Oct. 17, 1939

2,176,847

UNITED STATES PATENT OFFICE 2,176,847

SCANNING APPARATUS

Aloysius J. Cawley, Pittston, Pa.

Application August 7, 1930, Serial No. 473,660

34 Claims. (Cl. 178—7.1)

The invention relates generally to scanning for television purposes of the type wherein two separate elements coact to produce an intersecting scanning point. More particularly it concerns the use of a single rotating scanning element bearing a series of light permeable areas through which a light beam is passed in such manner that one of the light permeable areas is subjected to an image of an adjacent light permeable area to produce a scanning point. Heretofore two separately rotating elements each bearing light permeable areas were used together with complicated gearing. The invention eliminates all but one rotating element, and thus gives greater speed for the same energy supplied.

Some of the other objects of the invention are as follows:

A single rotating scanning element bearing two or more cylindrical portions each provided with a series of light permeable scanning areas.

A moving element provided with a series of light permeable elements or areas, the distance between successive light permeable areas being increased by a fixed increment in order to produce the desired shifting of the scanning line.

A moving element carrying a plurality of cylinders each provided with a series of light permeable areas, in such manner that the picture is both scanned and a chopper effect given by a single rotating element.

A single moving element supplied with a plurality of light permeable areas which accomplish scanning and chopping or masking as desired.

A single rotating disc bearing several circles of light permeable areas and means for combining and selecting different circles at will, thus varying the scanning.

A cabinet provided with a door which carries certain of the scanning apparatus, the remainder being stationary in the cabinet.

A single movable element consisting of a disc bearing a spiral and a cylinder bearing a series of transverse light permeable areas and means for projecting a light beam through the spiral and transverse line areas to produce scanning.

A single rotating cylinder carrying light permeable areas consisting of a helix and transverse portions and means for projecting the scanning light beam through both of said areas.

A single rotating cylinder carrying a helical neon or similar lamp preferably in sections actuated by a commutator and a series of transversely arranged light permeable areas with means for projecting a light beam from the lamp through the transverse portions to produce scanning.

A single rotating cylinder carrying a cylindrical lens in spiral form and a series of transverse light permeable areas and means for projecting a beam of light through the lens and transverse areas to produce scanning.

A single rotating element bearing a spiral cylindrical lens and a series of light permeable areas and means for projecting a beam of light through this lens and light permeable areas to produce scanning.

A single rotating element carrying a multiple turn helix or spiral either in the form of a light permeable area, a cylindrical lens or a neon or similar lamp actuated by a commutator coacting with a series of light permeable areas to produce scanning, and means for actuating but one turn of the spiral or helix per revolution to accomplish the scanning of a single image by several turns of the rotating element instead of one turn.

This application is an application of the nature of a continuation in part of my application Serial Nos. 468,117 and 425,610 of July 15, 1930 and February 3, 1930 respectively.

A more detailed description of the invention follows and is illustrated in the accompanying drawings, in which.

In all of the descriptions which follow it is to be understood that by the term light permeable areas I mean actual openings in the media, transparent portions, such as photographic productions, and lenses. A very desirable form of transverse light permeable area is a cylindrical lens. Kindly refer to Figure 1. The disc A rotating on shaft $l$ and firmly attached thereto by plate $p$ carries a cylindrical portion C, whose surface is illustrated at $a$ of this figure. It is to be noted that it contains a series of slots $ab$, $cd$. The neon lamp 3, which may also be an arc lamp, or other, is provided with the usual image varied current, which has been received and amplified from a distant station either by wire or wireless methods in the well known manner. The invention is merely concerned with scanning, and therefore none of the other apparatus is illustrated. Lens 4 produces a parallel beam of light from 3, while casing 5 prevents the undesirable spread of light from 5. The cylinder C bearing a surface similar to that shown at $f$ in Figure 1 at $a$, is moved at a uniform speed in synchronism with the rotating scanning element at the transmitting station. The light passes through the slot $ab$ and penetrates the prism 2 where it is reflected downward at the portions $ab$, and enters the second prism $2a$ and is reflected at $a'b'$ to the right through an adjacent slot as $cd$. It is to be noted that in the act of reflection the direction has been rotated through 90 degrees as shown at $a'b'$ in Figure 1 at $a$. It thus crosses the slot $cd$ producing a scanning point $i$ at the point of intersection. As the slot or cylindrical lens $ab$ moves downward in the figure, the reflected image moves upward, so that the slot $cd$ and the reflected image $a'b'$ of slot $ab$ give the exact equivalent of two oppositely moving slots. It is to be noted that any type of surface may be used such as the cylindrical surface C, the film $f$ and also a disc as shown in the forms to be later described.

Figure 1:
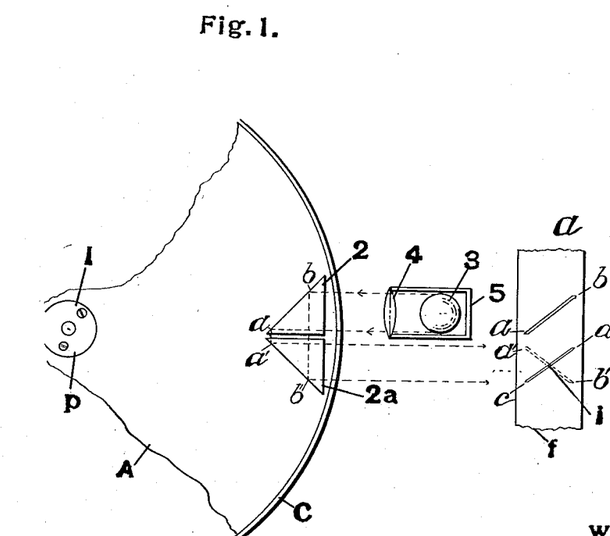
Figure 1 is an illustration of a cylinder carrying light permeable areas and demonstrating the method of using light projecting means and a reflecting prism to produce scanning of an image by subjecting one light permeable area to the action of an image of an adjacent light permeable area in such manner as to produce the effect of two oppositely rotating scanning elements.
Figure 2:
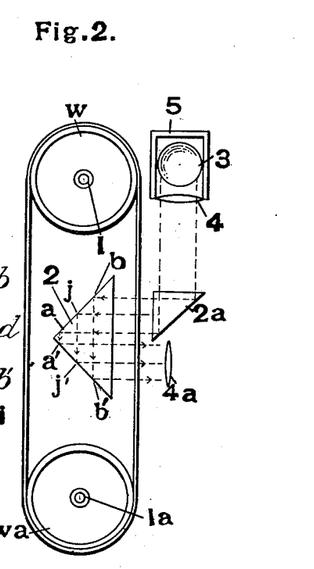
Figure 2 illustrates a moving film having light permeable areas and lenses and prisms for producing the effect of two oppositely moving scanning elements.

Figure 2 illustrates a film $f$ being moved by wheels $w$ and $wa$ on shafts $l$ and $la$. The surface of the film is shown in Figure 1 at $a$. The image varied light source is shown at 3 in casing 5 and lens 4 acts to produce a beam of parallel light which is reflected into the film by prism $2a$ whence it produces an image of slot $ab$ in the form of a flat beam of light. This beam is reflected by prism 2 at $bja$ to its opposite totally reflecting surface $a'j'b'$ and back through an adjacent slot $cd$, intersecting with which it produces a travelling intersecting point and thereby scans the picture area. It is to be noted that as the film moves downward and a point traverses points $b$, $j$, $a$, that those points through the act of reflection move upward through $b'$, $j'$, $a'$, This clearly illustrates the fact that there is an actual movement of a slot in one direction while there is a reflected movement of a phantom slot in the opposite direction that coacts with the former just as a real slot would do. This travelling light point then coacts with lens $4a$ which may be a simple viewing lens or an elaborate projecting lens system projecting the image on a screen. Those skilled in the art will readily understand the full meaning of the term scanning. It is to be pointed out that if all of the slots $ab$ are equally spaced, the intersecting point will produce the same scanning line in the same position repeatedly, if there is a graduated increase in the distance between the slots there will be a desired shifting of the scanning line, i. e. of the position of the travelling intersecting point $i$.

Figure 3:
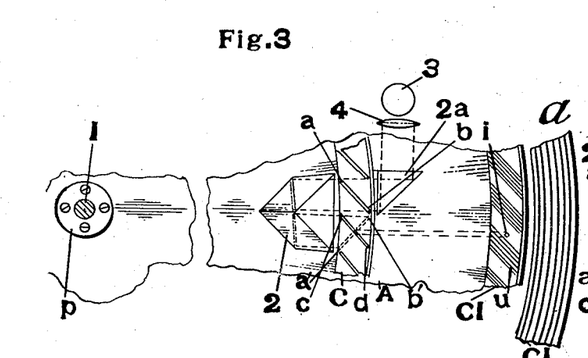
Figure 3 is an illustration of a single element consisting of a disc bearing one or more cylindrical portions together with projecting means and prisms for producing the effect by oppositely moving members and also masking or chopper effects.

In Figure 3, $l$ is a shaft carrying disc A and braced by end plate $p$. The cylinder C bears a series of scanning light permeable areas, either slots, rows of round or square holes or cylindrical lenses $ab$, $cd$. The disc may also have attached to it the cylinder $Ci$ which bears either masking areas $u$ or chopper areas. The latter may be either transverse or horizontal. Figure 1 at $a$ illustrates longitudinal lines or bands for producing chopper effects. The term chopper is understood by those skilled in the radio and television art. The image varied light source such as neon lamp 3 has a parallel beam formed therefrom by lens 4. This beam is reflected by prism $2a$ into the slot $ab$ forming a flat beam of light which is reflected by the prism 2 back through slot $cd$ with which it produces the moving intersecting point $i$, which is shown impinging upon the cylinder $Ci$ between the masking areas $m$. This slot will travel in a transverse direction, and shifts its position due to a gradual increase in the distance between successive scanning lines. The real slot travels in one direction while the flat beam of light which is an image of said slot is reversed in position and direction, i. e. it is reversed through an angle of 90 degrees. This produces the effect of two crossed slots with a common intersecting point travelling in opposite directions.

Figure 4:
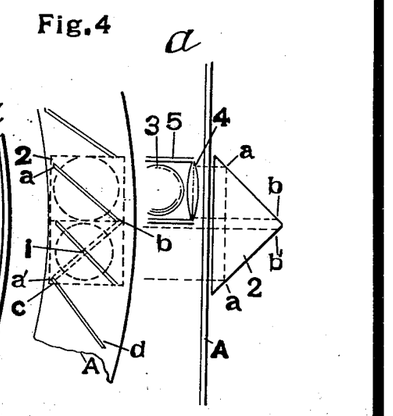
Figure 4 illustrates a disc bearing light permeable areas together with projecting lens and reflecting prism for producing the effect of two scanning elements.

Figure 4 illustrates two views of a disc provided with a series of slots or cylindrical lenses. Similarly, as the image varied light source has its light formed into a beam by lens 4, it is passed through slot ab and prism 2 rotates this through an angle of 90 degrees and reflects it through the adjacent slot cd as represented by a'b' and forming the intersecting point i. Figure 4 at a shows clearly the beam being reflected at ab to a'b' and back through the disc A and its slot cd. As one pair of slots pass through the image field another pair come into the field to take their place.

Figure 5:
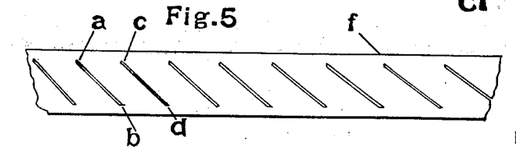
Figure 5 shows a developed form of the scanning element which may be a film and emphasizing the gradual increase in distance between the scanning areas.

Figure 5 is a developed view of a scanning surface which may be that of a disc, cylinder, film or other. Here it is represented by a film f. It is to be noted that all slots are in the same direction and are spaced with a gradually increasing distance apart. This increase in spacing is performed in order to produce a shifting of the scanning line in the picture field.

In Figure 5 it will be noticed that a scanning element consisting of a longitudinal belt or ribbon is provided with a plurality of rectangular slits, and the longitudinal distance between successive slits is progressively increased by a fixed amount, or increment. Figure 5, therefore, illustrates the arrangement of the light permeable areas on the belt scanners, as illustrated. Figure 1 illustrates the equivalent of such a belt or ribbon arranged in the form of a cylinder C. However, the disks of Figures 4 and 6, to be described more in detail later, have their light permeable areas arranged on the disks along a circular band concentric with the disk. Therefore "longitudinal," as used in the attached claims refers, in the case of the scanning disk, to a circular line concentric with the disk and passing through the light permeable areas. In the case of the cylindrical scanners, it refers to the distance along a circle drawn on the cylindrical surface through the light permeable areas. The distance between successive light permeable areas along this circular line or circle is progressively increased by a certain increment, and it is this distance that is referred to as a longitudinal distance.

Figures 6, 7, 8, 9, 10:
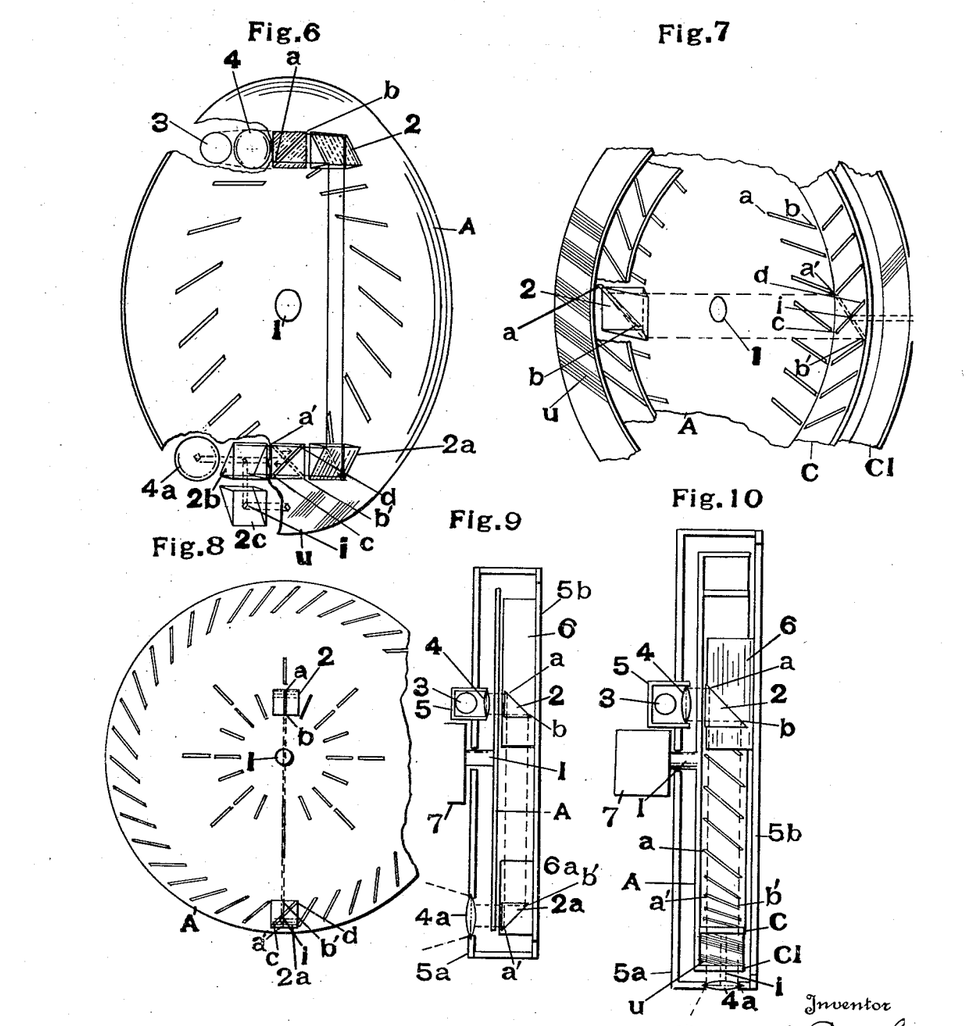
Figure 6 is an illustration of a single disc bearing a circle of scanning elements and also a circle of masking or chopper elements with means for successively projecting light through the various circles to produce simultaneously scanning, masking or chopping effects.
Figure 7 illustrates also a single scanning element of similar function to that of Figure 6 but differing therefrom in that cylindrical elements are added.
Figure 8 illustrates a single disc bearing several circles of scanning elements with prisms adjustably arranged so that different circles may be used at will thus varying the type of scanning as desired.
Figure 9 illustrates a manner of placing the apparatus of Figure 8 in a cabinet illustrating the fact that the prisms may be moved along a support, and also that opening the cabinet door renders the parts of the apparatus very accessible.
Figure 10 illustrates a single rotating disc bearing a circle of light permeable areas and two cylinders bearing similar areas together with lense and prism for producing both scanning and masking or chopper effects. Also a cabinet for same similar to that of Figure 9.

In Figure 6 A is a disc mounted upon shaft 1 and rotated by any means whatever thereon. The neon lamp 3 is supplied with the image varied current in a well known manner. Lens 4 forms a parallel beam and projects it through the light permeable area ab which is here shown as a cylindrical lens. The flat beam of light thus produced is reflected downward by prism 2 to prism 2a through another light permeable area cd as represented by a'b', producing an intersecting point i. The real slot cd and the phantom slot a'b' move in opposite directions with equal and opposite speeds which produces a shifting of the scanning point as described in connection with the above figures. If desired a prism 2b may be used to reflect this beam i into a second prism 2c which may turn the light beam i back through a masking or chopper area u carried on the same disc A. Viewing or projecting beams may be provided after the light has passed through the masking portions u. However, prism 2b and 2c may be eliminated, if desired, and the viewing or projecting means 4a provided on the opposite sides of the disc A. Thus a single disc may be made to perform functions, which are usually performed by three rotating elements with all of the attendant gearing. The elimination of the gearing alone is very desirable on account of the additional first cost, and increased loss of energy through friction and also wear.

Figure 7 illustrates a disc A mounted on a shaft 1 and having attached thereto the cylinder C bearing a series of light permeable areas cd and cylinder C1 bearing masking or chopper elements u. The disc A is provided with a circle of slots or cylinder lenses ab. A beam of light is projected through the slots ab and forms a flat beam of light which is reflected by the prism 2 through the series of slots cd on cylinder C as shown at a'b' producing the intersecting point i as described. The resultant beam of light then passes through the masking portions u on the cylinder C1 after which it is viewed or projected.

It will readily be apparent that the light source 3, shown in the various figures, may be an electric arc light or any other source of light desired, at the transmitting station and the parallel beam of light formed therefrom projected upon the persons or objects which are being televised. The light beam, which successively traverses the elemental areas of the objects or persons, is then reflected to photoelectric cells, or the like, in the well known manner. This fact is merely called attention to in order to bring out the high degree of universality possessed by the scanning apparatus covered by this invention, as it is adaptable to several methods of scanning.

Figure 8 represents a disc A mounted upon and moved by shaft 1 and bearing several circles of light permeable areas, any one or any two of which may be used for the production of scanning. A parallel beam of light is projected through slot ab upward vertically to the plane of the paper. It is reflected by prism 2 to prism 2a which in turn reflects it as a'b' to coact with slot cd with which it forms the intersecting point i. The circle of which slot ab forms a part is many times smaller than the circle of which cd is a part. For convenience the drawing shows only a slight difference between those two circles, in practice there is a vast difference. Therefore a'b' moves very slowly across the image field, while cd moves with great rapidity. Consequently the dot or point i repeatedly traverses a great many times and at a great speed from bottom to top of the field shown in the lower portion of the illustration. The picture is thus scanned. The prisms 2 and 2a are movable in order that they may coact with different circles as desired, and thus vary the scanning. The slots ab may be on a circle of an inch or so diameter, while the circle carrying cd may be several feet in diameter. Thus there is produced a great many traversals of the scanning point i. Also, if it is desired to place prism 2 over the circle carrying slots cd, this may be done by placing it in the upper portion of the circle 180 degrees from prism 2a. The scanning in that case would be of a type similar to that of Figure 1. Several intermediate circles may be placed between the circle carrying slots ab and that carrying slots cd, only one circle carrying slots ef is illustrated in the drawings. Many may be used in practice giving a great variety of scanning.

Figure 9 illustrates such a type of scanning apparatus as shown in Figure 8 placed in a cabinet. Motor 7 turns shaft 1 which supports and turns disc A. This disc carries several circles of light permeable areas. The cabinet is represented by 5a which supports the motor and casing 5 containing neon or other lamp 3 and lens 4. Door 5b which is hinged carries a shelf or support 6 which carries the prisms 2 and 2a which are movable in order to make them coact with any desired circle. The action of the prisms 2 and 2a is similar to that described in connection with the last figure. The image is viewed or projected by means of lens 4a. A flat beam of light is formed by passing light through ab which is reflected at ab in the prism 2 and at a'b' in the prism 2a. Any moving means such as rack and pinion, etc., may be provided in connection with prisms 2 and 2a on support 6.

Figure 10 illustrates a single moving element consisting of a disc A carrying two cylindrical portions C and C1. Motor 7 moves shaft 1 and the cylinder-disc element A, C and C1. Casing 5a supports motor 7 and casing 5 containing the neon lamp 3 which is supplied with image varied current. Lens 4 projects a parallel beam of light through a series of light permeable areas on disc A similar to that of Figure 8. This produces a flat beam of light ab which is reflected to cylinder C by prism 2 as indicated by a'b'. This produces the scanning intersecting point i. This intersecting portion of the beam i is projected through the cylinder C1 containing masking elements u, or if desired chopper elements may be provided, either transverse or longitudinal. Door 5b on hinges (not shown), when opened swings prisms 2 out for inspection. This prism is shiftable in order that it may coact with any of the several circles of scanning elements carried upon disc A. The lens 4a permits viewing or projection by suitable selection of the elements thereof.

Figures 11, 11A, 11B, 12, 13, 14:
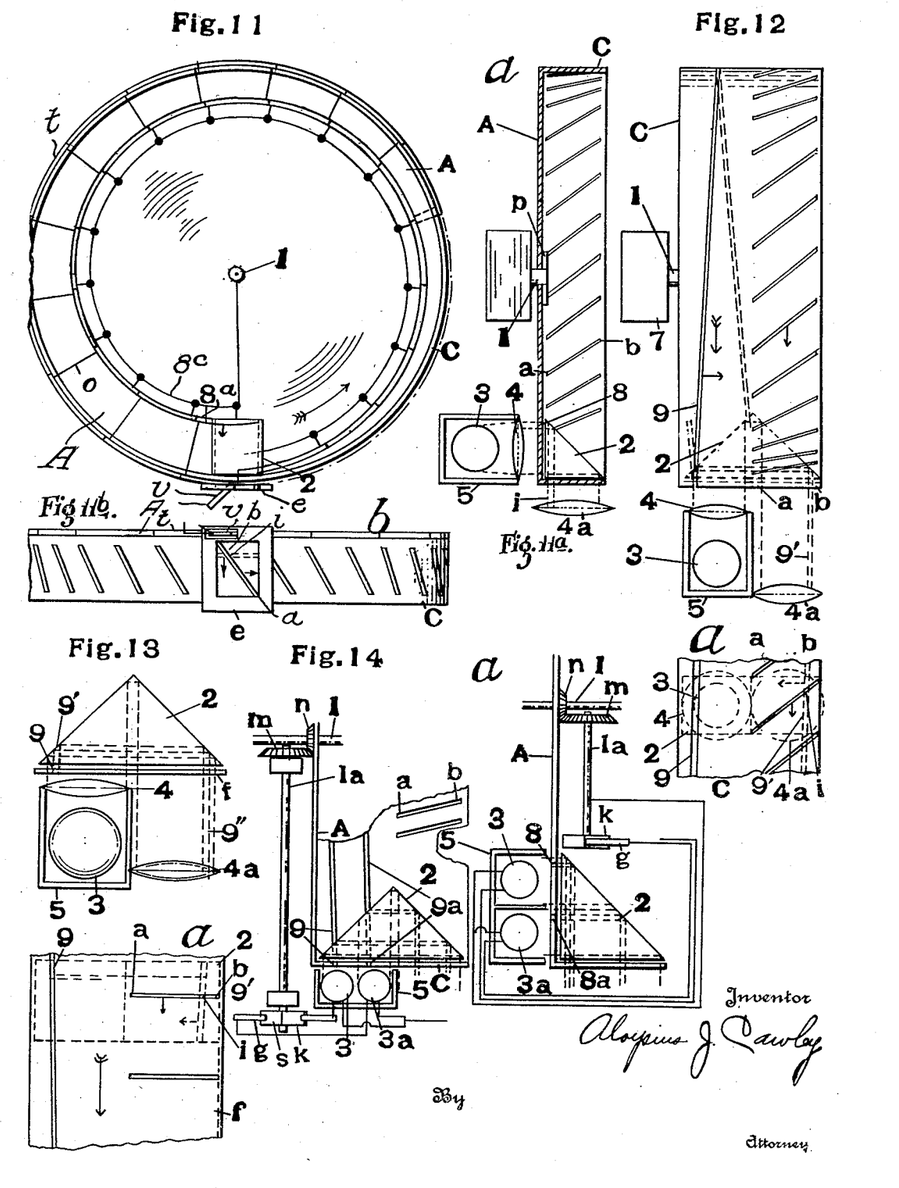
Figure 11 illustrates a single rotating element consisting of a disc bearing a light permeable area, or a lens or a spirally formed neon lamp and a cylindrical portion bearing light permeable areas and a prism to produce scanning of the type wherein one element moves slowly across the image area while another element traverses the area with great speed and frequency. Three views of the apparatus are illustrated.
Figure 12 illustrates a cylinder bearing a light permeable area, cylindrical lens or neon lamp in helical arrangement adjacent to a series of transverse scanning elements with a projecting lens passing the light through one portion of the cylinder and a prism reflecting the light back through another portion to accomplish scanning.
Figure 13 illustrates a film bearing adjacent light permeable areas consisting of a longitudinal slanting line and a series of transverse lines with means for projecting a light beam through one area and a prism for reflecting this beam back through the adjacent area to produce scanning.
Figure 14 illustrates scanning apparatus of the character of either of those described in connection with Figures 11 and 12, but having in addition one or more extra turns to the spiral or helix and means for actuating but one turn of the helix or spiral at a time.

Figure 11 illustrates a disc A mounted upon a shaft 1 and turned by any well known means. The disc is provided with a cylinder C which is provided with transverse light permeable areas as shown at a and b of this figure. The cylinder A is provided with a spirally arranged transparent linear portion, which may be produced photographically or by printing, or it may consist of a cylindrical lens spirally arranged. It may however consist as illustrated in the drawings of a spirally formed neon tube 8a, which may be arranged in sections, which are in turn actuated by commutator segments t arranged on the periphery of the cylinder C and played upon by a suitable brush v. A common return wire 8c may be placed parallel to the spiral tube, while wires O pass to the commutator segments on the cylinder C, in such manner that only the portion of the tube which is in the image area at the prism 2 is illuminated at any time. The prism 2 reflects and turns the flat beam of light produced by 8 downward in the figure through the cylinder and its light permeable areas ab; this is best understood by referring to a and b of Figure 11. During one revolution the line 8 traverses the full length of a picture or image area. The elements ab which may be cylindrical lenses as described in the above identified applications of mine traverse the picture with great frequency and speed, thus causing a rapid, repeated movement of the intersecting light point i producing scanning of the picture. Figure 11 at a shows the motor 7 turning shaft 1 and disc A bearing the spiral line. The image varied light 3 in casing 5 projects light through the line 8 and it is then reflected by prism 2 downward through the cylindrical lenses or slots ab producing the intersecting scanning line i which coacts with the viewing or projecting element represented by lens 4a. Figure 11 at b shows the transverse beam of light 8 moving downward as indicated by the arrow and the transverse slots or cylindrical lenses ab moving to the right. Those slots ab or lenses, may be placed at any angle desired, for instance they may be placed at right angles to the line 8. The cylinder, and for that matter all of the rotating elements in this application may be placed sidewise and thus rotated if desired. e is the frame. The image is shown as being scanned from left to right and from top to bottom, similar to the reading of a book, which is standard practice in television.

Figure 12 illustrates a motor 7 moving shaft 1 and cylinder C bearing a helical transparent line, cylindrical lens, or neon lamp 9, one turn of the helix occupying the entire circumference of the cylinder. Contiguous to this helix is a circle or band of transverse ligh permeable areas, which may consist of slots, or cylindrical lenses, as desired ab. Image varied light source 3 passes its light to lens 4 which produces a parallel beam of light which is projected through the transparent line or cylindrical lens 9 and produces a flat beam of light 9' which is reflected by prism 2 twice resulting in turning the beam back through the contiguous band carrying the light permeable areas ab, resulting in the production of an intersecting point and beam i which repeatedly scans the image area and coacts with the viewing or projecting system represented by lens 4a. Figure 12 at a illustrates the manner by which the transparent line 9 moves to the right as at 9 and its manner of reflection by prism 2 producing a second reflection as at 9', this latter beam passing from right to left as indicated by the arrow, taking a complete turn of the cylinder C to bring about a complete traversal of the beam 9' through the image area. The scanning elements ab shown as slots pass with great speed and frequency from top to bottom of the figure as indicated by the arrows. The intersecting portion of the areas ab and 9' is shown at i and this shifts its direction continuously. Spiral 9 may be made to turn in either direction, and thus lends great flexibility to the apparatus. If the cylinder is turned horizontally standard (left to right) scanning may be obtained.

Figure 13 shows image varied light source 3 in its casing 5. Lens 4 projects the light from the source through transparent line 9. The prism 2 reflects this flat beam as 9' twice and thence through the film f which is provided with transverse light permeable portions at this point. This beam 9'' coacts with the viewing or projecting system 4a. Figure 13 at a shows the film f provided with the longitudinal transparent line 9 and running the full length of the film which may be in the form of an endless band. This line 9 shifts in position transversely to the length of the film, and changes its position by an amount equal to the width of a picture. The transverse transparent lines ab intersect the reflected flat beam 9' which is produced by the transparent line 9. The transverse lines ab move rapidly at right angles to the beam 9'. ab and 9' are shown at right angles to each other. Any angle may be selected.

In Figures 11, 12 and 13 the scanning of a picture by a single spiral or helix of one turn was shown. Figure 14 illustrates a method of scanning by the use of a multiple turn spiral or helix, so that it takes more than one turn of the disc A or cylinder C to scan an image area. This gives greater detail to the image formed on account of the many more scanning elements traversing the image area. $l$ is a shaft turned by any means and supporting disc A which carries cylinder C. Instead of there being a single turn helix, a two turn helix is carried upon cylinder C. The two turns are represented by 9 and 9a. Two image varied light sources 3 and 3a in casing 5 are arranged to project their light by a suitable lens as described through the helix 9 and 9a producing a flat beam of light which is twice reflected by the prism 2 in the manner described in connection with the preceding figures. Those beams of light are returned through the adjacent portion of the film carrying the transverse light permeable areas ab as previously described. If both lamps 3 and 3a are used simultaneously, obviously each would have to be provided with a separate image varied current. This arrangement is claimed as new in this application. However, bevel wheels $m$ and $n$ are used to give to shaft $1a$ a speed of rotation equal to half that of shaft $l$. Commutator $k$ is mounted upon this shaft and is provided with a "live" segment equal to half of the circumference of the commutator, the other half of the commutator is "dead". The live segment is connected by a wire to the shaft $l$, and one leg of the electrical circuit is connected to the shaft by a brush. The two brushes $g$ are connected to the lamps 3 and 3a as shown, with the result that during one turn of the disc A and cylinder C one lamp such as 3 is illuminated. During the next turn the other lamp 3a is illuminated. The two turn helix with two revolutions of the disc A causes the line 9 and 9a to travel over the whole area of the picture filed. Thus but one light is illuminated at any time and only during the time of one revolution of the cylinder C. The lines ab move with great frequency and speed producing the usual intersecting point $i$. Figure 14 at $a$ illustrates a device similar to that of Figure 11, but differing only by means of a multiple turn spiral carried on disc A. Shaft $l$ moves disc A and cylinder C and also transmits motion at one speed to shaft $1a$ through bevel gears $m$ and $n$. Commutator $k$ makes one revolution for two revolutions of disc A. Image varied light sources 3 and 3a are each connected to a brush $g$ which plays at diametrically opposite points upon the circumference of the circle or commutator $k$. One section of the commutator equal to a half circumference is dead as described above. One turn of the spiral is represented by 8 and the other is represented by 8a. More turns and lamps, etc., may be used if desired. Upon the first revolution of the disc A, turn 8 is projected by a lens (not shown) as described in connection with the other figures, by means of prism 2 through the adjacent portion of the cylinder carrying the transverse light permeable areas. Upon the second turn of the disc A the lamp 3a is illuminated while lamp 3 is extinguished, and the remaining portion of the image area is traversed or scanned. Other turns may be added to the spiral as desired, it being of course necessary to add additional lamps, commutator segments, etc., as required.

When using a neon lamp in connection with Figures 11 and 12, a stationary cylindrical lens may be placed in front of the picture area, i. e. opposite the prism 2 in either of those modifications. The object of this is to obtain parallel rays therefrom.

The light emanating from the light source 3, such as a crater neon lamp, is formed into a parallel beam by optical system 4. It then traverses the light permeable areas or holes ab, cd, etc., in the moving scanning element $f$, and is thereby converted into a series of moving rectangular light beams. Those beams enter the reflecting element 2, travelling in a horizontal direction to the left, and have their direction of travel changed downward through an angle of 90 degrees. They then enter the prism 2a and have their direction of travel again turned through an angle of 90 degrees. The beam is now travelling horizontally to the right in contrast to its original direction. Therefore, the direction of travel is reversed, as the beams are now travelling in a direction directly opposite their original direction.

Figure 1a illustrates the fact that the original beam entered the slot ab and thus produced a beam of light travelling in the same direction of motion as that of the scanning element $f$ which bears the light permeable areas ab, etc. However, due to its reflection by the prisms 2 and 2a, the returning beam as indicated in Figure 1a at $a'b'$ will be moving in a direction opposite to that of element $f$, the original beam and the slot ab. Therefore, the direction of motion of the beam has been reversed. The beams formed by the slot ab will have the same inclination as slot ab, as shown in Figure 1a. However, the beam, after reflection, will have rotated on its axis to the position indicated by $a'b'$. Therefore, the beam is rotated on its axis! The rectangular beam is then formed into a beam $i$, which has an area approximately equal to that of the elemental area of the image. Therefore, the expressions used in the claims such as "reversing the direction of travel" and "reversing the direction of motion" will be clearly understood.

Having described my invention, I claim as new and desire to secure by Letters Patent:

1. A scanning apparatus consisting of electro-optical means forming a beam of image variable light, a movable medium adjacent to and in cooperative relation with said electro-optical element, a plurality of rectangular light permeable areas in cooperative relation with said electro-optical element, said areas being carried on said movable medium and capable of transmitting and converting said beam to form thereof a plurality of rectangular light beams, said light beams being movable in a direction of motion of said medium, and a reflecting element parallel to said plurality of light permeable areas adjacent the side of said movable medium which is opposite to said electro-optical element, said reflecting element including two reflecting surfaces inclined at an angle of 45 degress to the plane of said light permeable areas in order that said light beams shall traverse said light permeable areas a plurality of times to be formed thereby into a series of transversely movable scanning light beams whose cross-sectional area is substantially equal to an elemental area of the scanned image.

2. A scanning apparatus consisting of electro-optical means forming a beam of image variable light, a movable medium adjacent to and in cooperative relation with said electro-optical element, a plurality of rectangular light permeable areas carried on said movable medium in the path of said beam and capable of transmitting and modifying said beam to form thereof a plurality of movable, rectangular light beams, said light beams being movable in the general direction of motion of said medium, said light permeable areas being spaced apart at progressively different distances, a right angled prism adjacent the side of said movable medium that is opposite to said electro-optical element, said prism having its largest surface parallel to and substantially transversely coextensive with said group of light permeable areas, one of the smaller surfaces of said prism being directly opposite to and in cooperative relation with said electro-optical element, in order that said light beam shall traverse said light permeable areas a plurality of times to be formed thereby into a series of transversely movable scanning light beams whose cross-sectional area is substantially equal to the elemental area of the scanned image.

3. A scanning apparatus consisting of electro-optical means forming a beam of image variable light, a movable medium adjacent to and in cooperative relation with said electro-optical element, a group of parallel, rectangular light permeable areas in cooperative relation with said electro-optical element, said areas being carried on said movable medium and capable of transmitting and forming said beam into a series of longitudinally moving rectangular light beams, a reflecting element adjacent the side of said movable medium which is opposite to said electro-optical element, said element including two reflecting surfaces, one of said reflecting surfaces being in cooperative relation with said electro-optical element and in the path of said transmitted beam, said reflecting surfaces being inclined towards each other and in a direction longitudinal relative to said group of light permeable areas, said reflecting element being parallel to and substantially transversely coextensive with said light permeable areas, in order to reflect said beam back through a different portion of said surface bearing said light permeable areas to convert said longitudinally movable light beams into a series of transversely moving light beams.

4. A scanning apparatus consisting of an image variable light source, a lens in cooperative relation with said light source to form an image variable beam, a movable medium adjacent to and in cooperative relation with said light source and lens, a group of rectangular light permeable areas in cooperative relation with said light source and said lens, said areas being carried on said movable medium and acting to form said beam into a series of rectangular movable light beams, a reflecting element adjacent the side of said movable medium which is opposite to said light source and said lens, said reflecting element including two reflecting surfaces, one of said reflecting surfaces being in the path of said movable light beams, said reflecting surfaces being inclined towards each other and in a direction longitudinal relative to said group of light permeable areas, said reflecting element being placed parallel to and substantially transversely coextensive with said group of light permeable areas, in order that said movable light beams may be reflected back through a different portion of said light permeable areas to form thereof a series of scanning light beams whose cross-sectional area equals approximately the elemental area of the image scanned.

5. A scanning apparatus consisting of electro-optical means forming a beam of image variable light, a movable medium adjacent to and in cooperative relation with said electro-optical element, a group of parallel, rectangular light permeable areas in cooperative relation with said electro-optical element, said areas being carried on said movable medium and capable of transmitting and modifying said beam and two reflecting surfaces, one of said reflecting surfaces being in cooperative relation with said electro-optical element and in the path of said beam, said reflecting surfaces being adjacent the side of said movable medium which is opposite to said electro-optical element, said reflecting surfaces being inclined towards each other at substantially a right angle and inclined to said group of light permeable areas at an angle of 45 degrees, the plane including the bases of said surfaces being parallel to said light permeable areas, in order to reflect said light beam back through a different portion of said light permeable areas to be further modified so as to form of said beam a series of transversely moving scanning light beams.

6. A scanning apparatus consisting of electro-optical means forming a beam of image variable light, a movable medium adjacent to and in cooperative relation with said electro-optical element in the path of said beam, a group of parallel, rectangular light permeable areas in cooperative relation with said electro-optical element, said areas being carried on said movable medium in the path of said beam and capable of transmitting and modifying said beam, and a reflecting element in the path of said beam after transmission and adjacent the side of said movable medium which is opposite to said electro-optical element, said reflecting element being placed with its longest surface parallel to and substantially transversely coextensive with said group of light permeable areas and including two reflecting surfaces inclined towards each other at an angle of 90 degrees and also inclined longitudinally relative to said group of light permeable areas and acting to reflect said light beam back through an adjacent portion of said light permeable areas to form a series of transversely moving scanning light beams.

7. A scanning apparatus consisting of electro-optical means forming a beam of image variable light, a movable medium adjacent to and in cooperative relation with said electro-optical element, a group of rectangular light permeable areas in cooperative relation with said electro-optical element, said areas being carried on said movable medium and capable of transmitting and modifying said beam, a totally reflecting prism in the path of said transmitted beam adjacent the side of said movable medium which is opposite to that of said electro-optical element, the longest face of said prism being placed parallel to and substantially transversely coextensive with said light permeable areas, the other surfaces of said prism forming a right angle with each other and each of said surfaces being inclined at an angle of 45 degrees to the plane of said light permeable areas, in order to reflect said beam through an adjacent portion of said light permeable areas to form a series of scanning light beams.

8. A scanning apparatus consisting of electro-optical means forming a beam of image variable light, a movable medium adjacent to and in cooperative relation with said electro-optical element, a group of rectangular light permeable areas in cooperative relation with said electro-optical element, said areas being carried on said movable medium and capable of transmitting and modifying said beam, a right angled prism in the path of said transmitted beam adjacent said movable medium and on the side thereof opposite to said electro-optical element, one of the short surfaces of said prism being placed parallel to and subsantially transversely co-extensive with said light permeable areas, the long surface of said prism being inclined in the direction of motion of said light permeable areas and acting to change the direction of said light beam, and a second right angler prism having one of its short surfaces parallel to and substantially transversely co-extensive with said light permeable areas and having its longest surface inclined to the longest surface of said first right angled prism, in order to reflect said light beam back through an adjacent portion of said light permeable areas to form a series of scanning light points.

9. A scanning apparatus consisting of electro-optical means forming a beam of image-variable light, a movable medium adjacent to and in cooperative relation with said electro-optical element, a group of rectangular light permeable areas in cooperative relation with said electro-optical element, said areas being carried on said movable medium and capable of transmitting and modifying said beam, two right angled prisms placed adjacent the side of said movable medium which is opposite to said electro-optical element, one of said prisms being in the path of said transmitted beam, each of said prisms having a short face facing each other and their opposite short faces in the same plane and placed parallel to and substantially transversely coextensive with said light permeable areas, the longest faces of said prisms being inclined towards each other, in order that said beam shall be reflected back through a different portion of said light permeable areas to form a series of transversely moving light beams.

10. A scanning apparatus consisting of electro-optical means forming a beam of image variable light, a rotatable cylinder adjacent to and in cooperative relation with said electro-optical element in the path of said beam, a group of rectangular light permeable areas in cooperative relation with said optical element and carried on said rotatable cylinder in the path of said beam and capable of transmitting and modifying said beam, a right angled prism in the path of said transmitted beam adjacent said rotatable cylinder and on the side thereof opposite to said electro-optical element, the longest face of said prism being placed parallel to and substantially transversely coextensive with said light permeable areas, the other surfaces of said prism constituting reflecting surfaces in order to cause the light transversing said light permeable areas of said cylinder to pass back through said light permeable areas to be thereby limited to an elemental area of the image transmitted.

11. A scanning apparatus consisting of electro-optical means, a rotatable disk adjacent to and in cooperaive relation with said electro-optical element, a group of rectangular light permeable areas in cooperative relation with said electro-optical element, said areas being carried on said disk and acting to form a series of moving rectangular light beams, a right angled prism adjacent said rotatable disk in relation with the face thereof which is opposite to said electro-optical element, the longest face of said prism being placed parallel to and substantially transversely coextensive with said light permeable areas, the other surfaces of said prism forming an angle of 45 degrees with said group of light permeable areas, in order that said rectangular light beams may be passed back through said light permeable areas to produce a series of transversely moving light beams constituting elemental areas of the image transmitted.

12. A scanning apparatus consisting of electro-optical means forming a beam of image variable light, a rotatable disk adjacent to and in cooperative relation with said electro-optical element and in the path of said beam, a group of rectangular light permeable areas in cooperative relation with said electro-optical element, said light permeable areas being arranged in a circle on said disk in the path of said beam and being capable of transmitting and modifying said beam, a right angled isosceles prism adjacent the side of said disk opposite to said optical element in the path of said transmitted beam, the longest surface of said prism being inclined at an angle of 45 degrees to the surface of said disk and also inclined towards the diametrically opposite side of said circle in order to reflect said beam in a direction parallel to the plane of said disk and a second right angled isosceles prism in the path of said reflected beam and diametrically opposite to said first prism, the longest surface of said second prism being inclined at an angle of 45 degrees to the surface of said disk and towards said first prism and acting to further reflect said reflected beam through said light permeable areas to be further modified to form a series of scanning light beams.

13. A scanning apparatus consisting of electro-optical means, a rotatable disk adjacent to and in cooperative relation with said electro-optical element and in the path of said beam, a group of rectangular light permeable areas arranged in a circle on said disk in the path of said beam and capable of transmitting and modifying said beam, a reflecting surface in the path of said transmitted beam adjacent the side of said disk opposite to said electro-optical element and adjacent a point on said circle where said light beam is transmitted, said reflecting surface being inclined at an angle of 45 degrees to the plane of said disk and in a direction transverse relative to said group of light permeable areas and acting to reflect said beam parallel to said plane and a second reflecting surface in the path of said beam after reflection and adjacent a second point on said circle where said disk is moving in a direction relatively opposite to said first point, said second reflecting surface being inclined at an angle of 45 degrees to the plane of said disk and towards said first reflecting element and acting to reflect said light beam back through said light permeable areas to be further modified in such manner as to convert said beam into a series of scanning light beams.

14. A scanning apparatus consisting of electro-optical means, a rotatable disk adjacent to and in cooperative relation with said electro-optical element and in the path of said beam, a group of rectangular light permeable areas arranged in a circle on said disk in the path of said beam and capable of transmitting and modifying said beam, a reflecting surface in the path of said transmitted beam adjacent the side of said disk opposite to said electro-optical element and adjacent a point on said circle where said light beam is transmitted, said reflecting surface being inclined at an angle of 45 degrees to the plane of said disk and in a direction transverse relative to said group of light permeable areas and acting to reflect said beam parallel to said plane and a second reflecting surface in the path of said beam after reflection and adjacent a second point on said circle substantially 180 degrees removed from said first point, said second reflecting surface being inclined at an angle of 45 degrees to the plane of said disk and towards said first reflecting element and acting to reflect said beam back through said light permeable areas to be further modified in such manner as to convert said beam into a series of scanning light beams.

15. A scanning apparatus for television consisting of a movable medium, a plurality of linear light permeable areas borne on said medium, means for producing and projecting image varied light through said light permeable areas to form a series of movable rectangular light beams, and reflecting means in cooperative relation with said medium and said rectangular light beams to reflect said beams back through said rectangular light permeable areas on different portions of said medium to convert said light beams into a series of movable scanning light beams whose cross-sectional area is substantially equal to that of an elemental area of the image scanned.

16. A scanning apparatus consisting of a movable medium, a plurality of means for unilaterally converging a light beam borne on said movable medium, means for producing and projecting image varied light through said converging means to form a series of movable rectangular light beams, and reflecting means in cooperative relation with said medium and said rectangular light beams to reflect said beams back through said converging means on different portions of said medium to convert said light beams into a series of movable scanning light beams whose cross-sectional area is substantially equal to that of an elemental area of the image scanned.

17. A scanning apparatus consisting of a rotatable disk, a plurality of rectangular light permeable areas borne on said disk, means for producing and projecting image varied light through said rectangular light permeable areas to form a series of rectangular light beams, and reflecting means in cooperative relation with said medium and said rectangular light beams to reflect said beams back through said rectangular light permeable areas on a different portion of said medium to convert said light beams into a series of movable scanning light beams whose cross-sectional areas is substantially equal to that of an elemental area of the image scanned.

18. A scanning apparatus consisting of a movable medium, a single series of linear light permeable areas borne on said movable medium, means for producing and projecting image varied light through said light permeable areas to form a series of movable rectangular light beams, and reflecting means consisting of a pair of reflecting surfaces inclined towards each other in cooperative relation with said medium and said rectangular light beams to reflect said beams back through said linear light permeable areas on a different portion of said medium to convert said light beams into a series of transversely movable scanning light beams whose cross-sectional area is substantially equal to that of an elemental area of the scanned image.

19. A scanning element consisting of a longitudinally movable belt, a series of light permeable areas arranged longitudinally on said belt, the longitudinal distance between the successive light permeable areas of said series being increased progressively by a fixed increment.

20. A scanning element consisting of a movable medium, a portion of the surface of said medium being cooperable with a light beam, said portion constituting a light beam engaging area, a plurality of rectangular light permeable areas occupying said beam engaging area on said movable medium, said light permeable areas extending transversely across substantially the entire width of said light beam engaging area, the longitudinal distance between successive light permeable areas being progressively increased by a fixed increment.

21. In television scanners, a combination light source and scanner including a helical light producing tube having all its turns of substantially uniform radii, means for energizing only one turn of said helix at one time, means for supplying television signals to said tube, means for rotating said tube about its axis, and means including a reflecting element for delimiting the light from said tube to the area of a single elemental area at each instant.

22. Television scanning apparatus including an electro-optical translation device arranged in the shape of a helical tube having all its turns of substantially uniform radii, screening means including a reflecting element effectively screening at any instant all of said helical tube except a single elemental scanning area thereof and means for rotating said tube at a speed sufficiently great to sequentially expose single elemental scanning areas thereof through said screening means at a rate of speed above the limit of persistence of vision.

23. In combination: a single movable medium consisting of a disk and two concentric cylinders fixedly attached thereto, a series of rectangular light permeable areas carried on said disk, a second series of light permeable areas on one of said cylinders, a third series of light permeable areas carried on the other of said cylinders, an image variable light source adjacent said moving medium, a lens in cooperative relation with said light source to direct a beam of light through said series of light permeable areas carried on said disk and a reflecting surface adjacent said series of light permeable areas on said disk and on the opposite side of said disk to said light source, said surface being so inclined toward the center of said disk as to direct the light which has passed through said disk parallel to the surface of said disk and cause it to pass through the light permeable areas carried on both of said cylinders, said reflecting surface also being disposed opposite the side of the center of said disk from the points on at which said light passes through said light permeable areas which are borne on said cylinders.

24. In combination: a single moving medium consisting of a disk and a cylinder fixedly attached thereto, two series of rectangular light permeable areas, one of said series being carried on said disk and the other of said series being borne on said cylinder, an image variable light source adjacent said moving medium, a lens in cooperative relation with said light source to direct a beam of light through said series of light permeable areas borne upon said disk, a reflecting surface adjacent said series of light permeable areas on said disk and on the opposite side of said disk as said light source, said surface being inclined at an angle towards the center of said disk in order to reflect the light which has traversed the series of light permeable areas borne on said disk through the series of light permeable areas borne on said cylinder, said reflecting surface being also disposed opposite the side of the center of said disk from the point on said cylinder at which said light passes through said series of light permeable areas borne on said cylinder in order to form a series of successive light beams which move transversely to the direction of motion of said cylinder.

25. In combination: an optical element forming a beam of image variable light and directing said beam in a definite direction, a rotatable disk bearing a cylinder attached thereto, a light permeable area arranged in a spiral on said disk adjacent said optical element and in the path of said beam, a second group of rectangular light permeable areas arranged on said cylinder and a reflecting surface in the path of said beam and opposite to said light permeable areas carried on said disk, said surface being inclined at an angle of 45 degrees to the plane of said disk and also inclined towards said cylinder and acting to reflect said beam parallel to the surface of said disk and through the said second group of light permeable areas arranged upon said cylinder in order to produce a plurality of transversely moving scanning light beams.

26. In combination: a plurality of light source alternately forming a beam of image variable light and directing said beam in a definite direction, a commutator cooperatively connected with said light sources to alternately illuminate said sources, a rotatable disk with a cylinder fixedly attached thereto in cooperative relation with said light sources, suitable gearing connecting said disk with said commutator, a light permeable area arranged in the form of a multiple turn spiral on said disk in cooperative relation with said light sources and transmitting said beam therethrough, a second group of light permeable areas arranged on said cylinder in the form of more or less transverse rectangular light permeable areas including a light reflecting surface at an angle of 45 degrees to said disk and said cylinder, said reflecting element placed with one face adjacent and coextensive with said spirally arranged light permeable areas and the other face opposite said transversely arranged light permeable areas and acting to reflect said beam after transmission through said spirally arranged light permeable areas through said transversely arranged light permeable areas in order to form a series of moving light beams.

27. In combination: a plurality of light sources alternately forming beams of image variable light and directing said beams in a definite direction, a commutator cooperatively connected with said light sources to alternately illuminate said sources, a rotatable cylinder adjacent to and in cooperative relation with said beam, suitable gearing connecting said cylinder with said commutator means of which said light sources are alternately illuminated, two groups of light permeable areas juxtaposed on said cylinder, one of said groups consisting of a single area arranged in the form of a multiple turn helix, the other of said groups consisting of a plurality of more or less transversely arranged rectangular light permeable areas, a reflecting element including two reflecting surfaces making an angle of 90 degrees with each other being placed adjacent the side of said cylinder and in cooperative relation with said light permeable areas, one of said light permeable areas being adjacent said helically arranged group of light permeable areas and making an angle of 45 degrees with the plane of said cylinder and inclined transversely thereto and acting to reflect said transmitted beam parallel with and transverse to said cylinder, the other of said surfaces being transversely inclined to the surface of said cylinder and placed adjacent said group of transverse light permeable areas and receiving and directing said reflected beam through said transverse light permeable areas, in order to form a series of moving light beams.

28. In combination: a disk, a glow lamp adjacent said disk, two series of rectangular light permeable areas concentrically arranged in circles on said disk at an angle to the radius of said disk, a lens directing the light from said lamp through one of said series of light permeable areas at one point on said circle, a reflecting surface opposite said point and inclined toward the opposite side of said circles, a second reflecting element at a point on said second circle diametrically opposite said point, both of said reflecting surfaces being inclined toward each other so that the light is redirected back through said second series of light permeable areas to form a series of light beams which move transversely to the direction of motion of said disk.

29. In combination: an optical element forming a beam of image variable light and directing said beam in a definite direction, a rotatable disk adjacent said optical element and in the path of said beam, a plurality of groups of light permeable areas arranged in concentric circles on said disk and capable of transmitting and modifying said beam, a reflecting surface in the path of said beam and opposite to one of said groups of light permeable areas, said surface being inclined at an angle of 45 degrees to the plane of said disk and towards a point on said disk 180 degrees (there from) and acting to reflect said beam parallel to the surface of said disk and a second reflecting surface placed in the path of said reflected beam, said second surface being placed at said point opposite a second group of light permeable areas where said group is oppositely moving to said first group of light permeable areas and being inclined at an angle of 45 degrees towards said first reflecting surface and acting to reflect said reflected beam through said second group of light permeable areas to be further modified thereby to form a series of transversely moving light points or beams.

30. In combination: an optical element forming a beam of image variable light and directing said beam in a definite direction, a rotatable disk adjacent said optical element and in the path of said beam, a plurality of groups of light permeable areas arranged in concentric circles on said disk and capable of transmitting and modifying said beam, the light of said light permeable areas constituting certain of said groups being radially arranged and the light permeable areas of certain other of said groups being arranged at an angle to the radius of said disk, a reflecting surface in the path of said beam and opposite to one of said groups of light permeable areas, said surface being inclined at an angle of 45 degrees to the lane of said disk and towards a point on said disk 180 degrees therefrom and acting to reflect said beam parallel to the surface of said disk and a second reflecting surface placed in the path of said reflected beam, said second surface being placed at said point opposite a second group of light permeable areas where said group is oppositely moving to said first group and being inclined at an angle of 45 degrees towards said first reflecting surface and acting to reflect said reflected beam back through said second group of light permeable areas to be further modified thereby to form a series of transversely moving light points or beams.

31. A television apparatus according to claim 30 in which said reflecting surfaces are movable and means for moving said reflecting surfaces in order that they may be placed over different groups of light permeable areas in order to obtain a different frequency of moving light points or beams per revolution of said disk.

32. In combination: an optical element forming a beam of image variable light and directing said beam in a definite direction, a rotatable disk adjacent said optical element and in the path of said beam, a plurality of groups of light permeable areas arranged in concentric circles on said disk and capable of transmitting and modifying said beam, the light permeable areas consttituting certain of said groups being radially arranged and the light permeable areas of certain other of said groups being arranged at an angle to the radius of said disk, a prism including a reflecting surface in the path of said beam and opposite to one of said groups of light permeable areas, said surface being inclined at an angle of 45 degrees to the plane of said disk and towards a point on said disk 180 degrees therefrom and acting to reflect said beam parallel to the surface of said disk and a second prism placed in the path of said reflected beam, said second prism being placed at said point opposite a second group of light permeable areas where said group is oppositely moving to said first group of light permeable areas and being inclined at an angle of 45 degrees towards said first reflecting surface and acting to reflect said reflected beam through said second group of light permeable areas to be further modified thereby to form a series of transversely moving light points or beams.

33. In combination: an optical element forming a beam of image variable light and directing said beam in a definite direction, a rotatable cylinder in the path of said beam, two groups of light permeable areas juxtaposed on said cylinder, one of said groups consisting of a single helically arranged light permeable area placed directly in the path of and traversed by said beam and the other of said groups consisting of a series of parallel light permeable areas more or less transversely arranged, a reflecting surface in the path of said beam on the side of said cylinder opposite to said optical element, said surface being inclined at an angle of 45 degrees to the surface of said cylinder and also transversely thereto and acting to reflect said beam parallel to the surface of said cylinder and in a direction transverse to the motion of said cylinder and a second reflecting surface adjacent the other of said groups of light permeable areas, said surface being inclined at an angle of 45 degrees to the surface of said cylinder and at an angle of 90 degrees with the first of said reflecting surfaces and acting to rceive and reflect said reflected beam through the second of said groups of light permeable areas to form a series of moving light beams.

34. A television scanning apparatus including an electro-optical translating device arranged in the shape of a spiral tube, each turn of said spiral tube being divided into separately illuminable sections, means in cooperative relation with said tube for successively illuminating each of said sections, means for rotating said tube about its axis and means including a stationary inclined reflecting surface and a series of transverse slots for screening all of said tube at any instant except a single elementary scanning area thereof.

ALOYSIUS J. CAWLEY.